Jan. 7, 1930. J. V. APABLASA 1,742,433
METHOD OF TREATING FILTERING MATERIALS
Filed Dec. 21, 1923
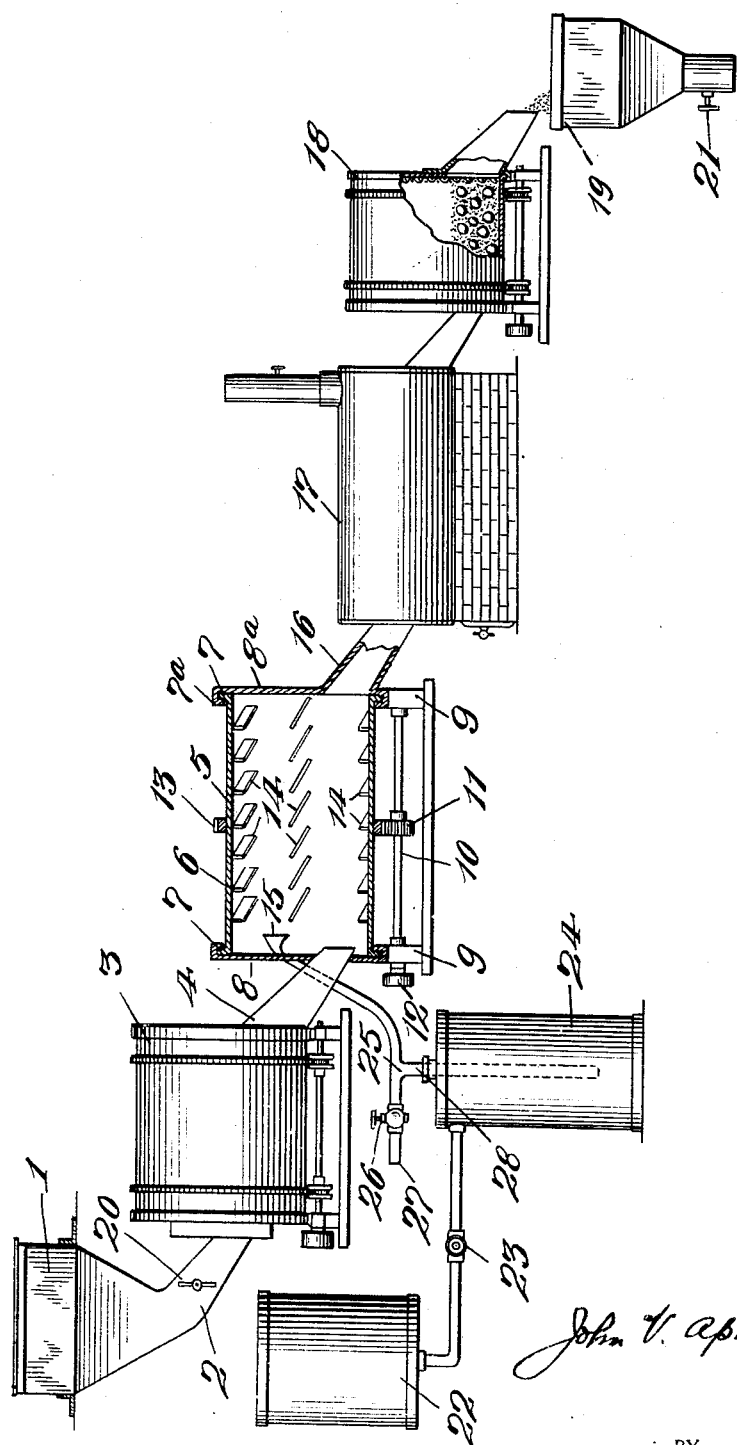

Patented Jan. 7, 1930

1,742,433

UNITED STATES PATENT OFFICE

JOHN V. APABLASA, OF LOS ANGELES, CALIFORNIA, ASSIGNOR TO O. J. SALISBURY, OF SALT LAKE CITY, UTAH

METHOD OF TREATING FILTERING MATERIALS

Application filed December 21, 1923. Serial No. 681,919.

This invention relates to a process and apparatus for use in preparing clay, charcoal, carbon and similar materials for use in filtering, bleaching, decolorizing and clarifying oils, aqueous solutions, sugar, syrups, fruit juices and vegetable juices and the like.

It is one of the objects of the invention to provide a process and apparatus whereby these materials may be prepared originally as filtering and bleaching agents or revivified in a more economical and expeditious manner than has heretofore been possible.

Another object of the invention is to provide a process and apparatus for preparing natural clays and earthy material for use in filtering and bleaching oils, syrups, etc., whereby the acid and other solutions heretofore used for this purpose are conserved and a better bleaching clay with unimpaired physical structure is produced.

Various other objects and advantages will appear as the description of the invention proceeds.

A characteristic feature of my invention over the prior processes of preparing clays or similar materials for use in bleaching, filtering, etc., is that instead of agitating or boiling the clays with a large amount of acid, I am able to secure a better treatment or preparation of the clay by spraying the same while in a finely divided and dispersed state with a comparatively small amount of the treatment liquid.

This application is a continuation in part of my prior application, Serial No. 642,033 filed May 28, 1923, which discloses the method set forth in the present application as applied to the treatment of clays. I have now found that this method is not only applicable to the treatment of clays but also to the treatment of the other filtering materials above specified. The present application also covers an apparatus for carrying out one embodiment of the method.

In accordance with the preferred embodiment of my invention, I have illustrated on the accompanying drawing a diagrammatic layout of one form of apparatus suitable for practicing the principles of my invention.

In the drawing, 1 designates a suitable storage bin for the crude clay or other filtering material. From the bin 1 a chute or trough 2 conducts the raw material to a grinding mill 3 which may be of the ball or pebble type or any other desired variety adapted for fine grinding. From the mill 3 the finely ground material passes through the trough 4 to a rotating drum or mixing chamber 5. The chamber 5 comprises a tubular body member 6 provided with flanged ends 7 adapted to be closed by the stationary members 8 and 8ª which are turned over the flanges 7 as illustrated at 7ª to make a close fitting seal for the drum. The ends 8 and 8ª are supported upon the stationary supports 9 which also provide bearings for the shaft 10 carrying the gear wheel 11. When suitable power is applied to the pulley 12 of the shaft 10 the drum 6 is rotated in the ends 8 and 8ª by means of the gear 11 and the gear 13 which encircles the drum. A series of baffles 14 are arranged in the drum so that the finely ground clay or other filtering material is continually carried to the top of the drum and dropped in a fine shower or spray to the bottom thereof. Extending through the end of this drum is an atomizer nozzle or spray 15 by which the finely divided clay particles can be sprayed with a suitable solution to effect the treatment thereof. From the mixing drum 5 the moist clay passes through the chute 16 to a drier 17 of any suitable type, and from the drier the dried clay is passed again into a grinding mill 18 where it is ground to the proper size for filtering, bleaching or the like and then stored in the bin 19 until it is desired to use the same. Suitable cut off means are provided at 20 and 21 for controlling the flow of the material from the bins 1 and 19.

The treating solution, which of course, will vary with the composition of the particular clay or other filtering material being treated and according to the purpose for which the treated materials are to be used, is contained in the tank 22 from which it flows by gravity under the control of valve 23 into the tank 24. Any suitable means may be provided for forcing the solution from the tank 24 thru the spray nozzle 15 into the drum 5. In the embodiment illustrated this comprises an atomizer 25 controlled by a valve 26 and consisting of a pipe 27 which is supplied with compressed air from a source not shown and a suction pipe 28 which extends below the surface of the solution in the tank 24. When the compressed air is turned into the pipe 27 by the valve 26 it sucks a portion of the solution in the tank 24 thru the pipe 28 and injects it in a fine spray thru the nozzle 15 into the drum 5.

When these clays or other filtering materials are treated as described with the desired solution, the finely divided filtering material and the sprayed solution give a practically instantaneous reaction which results in producing a clay or filtering material having a high bleaching power and at the same time of such physical structure as to be a most efficient aid in filtration.

With certain clays which can be purified without using large amounts of the treatment solution it is often possible to eliminate the final grinding step, as the clay when it comes from the drier is in a sufficiently fine condition to be used for filtering.

While my process and apparatus is designed for use in treating clays and other filtering materials of various composition, it has been found particularly effective in treating the clay or earthy material located in the Red Rock Mining District, Kern County, California.

The term clay as used in this application, however, is to be construed in a broad sense and embraces all of the clay or earthy materials which may be found suitable for bleaching or filtering purposes. For example, it will include such substances as montmorillonite, bauxite, kalonite, fuller's earth, diatomaceous earths and kindred substances.

For various purposes the clays or earthy materials may be treated with different solutions which may be composed of different proportions of hydrochloric, sulphuric or nitric acid in combination with alkaline sulphites or chlorides.

For clays used in filtering and bleaching mineral or vegetable oils and animal fats, I have found the use of a solution consisting of ten to eight hundred grams of sulphuric acid, 66° Bé., five to fifty-five grams of sodium silicate, five to fifty grams of sodium bi-sulphite and ten to two hundred grams of water for every ten pounds of clay to be satisfactory. The solution may be sprayed upon the finely divided clay either cold or hot and may be varied in strength depending upon the particular oil or fat to be filtered and the degree to which it is to be decolorized.

Fir mineral oils alone I have found that a satisfactory treatment can be made by first spraying the proportion of sulphuric acid above named, i. e., ten to eight hundred grams, upon the finely divided clay and then spraying the clay with ten to one hundred fifty grams of gasoline, distillate or kerosene in a cold state.

While I have disclosed certain specific solutions which may be used in connection with certain filtering materials for carrying out my process, it is to be understood that my invention is not limited to the treatment of the clays named with these solutions, but contemplates broadly the treatment of various clay, charcoal, carbon and earthy filtering materials by spraying the same while in a finely divided state with a suitable treatment solution.

It is apparent therefore, that various modifications and changes may be made in the particular apparatus and materials disclosed herein without departing from the spirit of the invention or the scope of the appended claims.

What I claim is:

1. The method of treating filtering and bleaching clays, which comprises treating the material in a dry and finely divided condition with a small amount of treatment solution comprising the reaction products of sulphuric acid, sodium silicate, sodium bi-sulphite, and water, the amount of treatment solution used relative to the amount of material treated being insufficient to cause fluidity of the material.

2. The method of treating filtering and bleaching clays, which comprises spraying the material while in a dry and finely divided condition with a treatment solution comprising the reaction products of 10 to 800 grams of sulphuric acid, 5 to 55 grams of sodium silicate, 5 to 50 grams of sodium bi-sulphite, and 10 to 200 grams of water, the relative amounts varying in proportion to the amount and nature of the impurities in the material, and the amount of treatment solution used relative to the amount of material treated being insufficient to permit boiling of the material and solution.

3. The method of treating filtering and bleaching clays, which comprises reducing the filtering material to a finely divided condition, introducing the finely divided material into a treatment zone and dispersing the particles thereof in the atmosphere of said zone while simultaneously bringing an atomized solution composed of the reaction products of from 10 to 800 grams sulphuric acid, 66° Bé., 5 to 55 grams of sodium silicate, five to fifty grams of sodium bisulphite, and 10 to 200 grams of water to every 10 pounds of material.

In testimony whereof I have affixed my signature to this specification.

JOHN A. APABLASA.